N. McLEOD.
Transplanters.
No. 155,036. Patented Sept. 15, 1874.
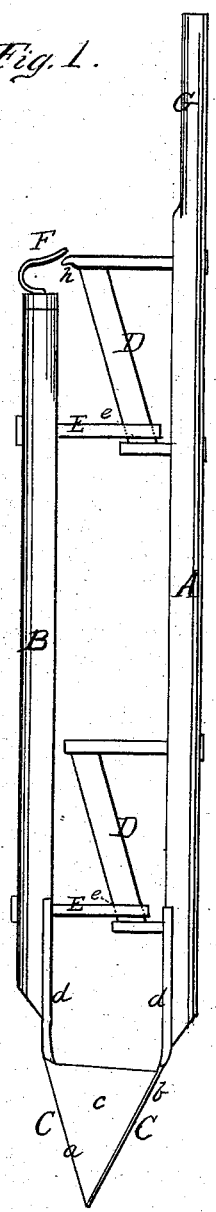
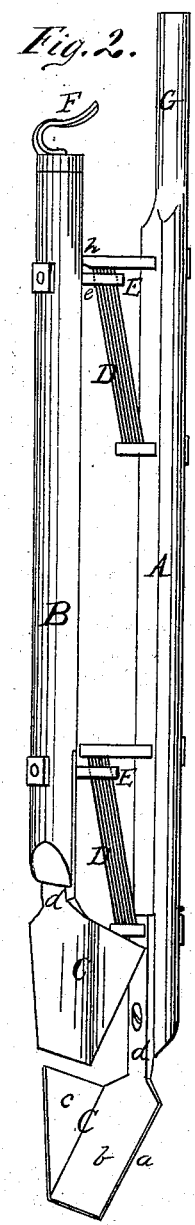
WITNESSES
INVENTOR
Norman McLeod
By Chipman & Fosmire & Co
ATTORNEYS.

UNITED STATES PATENT OFFICE.

NORMAN McLEOD, OF CLIO, SOUTH CAROLINA.

IMPROVEMENT IN TRANSPLANTERS.

Specification forming part of Letters Patent No. 155,036, dated September 15, 1874; application filed February 28, 1874.

*To all whom it may concern:*

Be it known that I, NORMAN McLEOD, of Clio, in the county of Marlborough and State of South Carolina, have invented a new and valuable Improvement in Transplanters and Thinners; and I do hereby declare that the following is a full, clear, and exact description of the construction and operation of the same, reference being had to the annexed drawings, making a part of this specification, and to the letters and figures of reference marked thereon.

The figures of the drawings are representations of my transplanter and thinner.

This invention has relation to means for transplanting young plants successfully in any weather, and for thinning out when the growth is too thick; and it consists in the construction and novel arrangement of the angle-spades and their parallel-moving handles, connected and operated as hereinafter more fully described.

In the accompanying drawings, the letter A designates the main staff or handle. B is its fellow, arranged parallel with the main staff, and preferably made somewhat shorter. C C indicate a pair of spades of similar form. The blade $a$ of each spade is made of sheet-steel, and consists of a quadrangular back, $b$, and a triangular side or wing, $c$, bent at right angles with the back. From the blade extends upward a shank, $d$, by which it is secured to the handle. Each staff or handle is provided with a spade, C, so arranged that when the sliding staff B is down, the lower edges of the blades shall be set to meet each other, and the wing of each to fit against the free edge of the other blade. D D indicate guide-irons, having an angular position with reference to the main staff, to which they are secured parallel with each other, and having a similar inclination to that of the sliding staff B. E E indicate slide irons or bolts, secured to the sliding staff B, and provided with eyes $e$, or otherwise arranged to engage with the guides D D. In this manner the sliding staff is arranged to move up and down on the guides in the same direction with the blade attached to its lower end. When closed, the blades C C, which are attached to the staves in such a manner as to form an angle with the same, constitute a V-shaped box or receptacle. When opened, by raising the sliding staff, the latter moves upward and outward obliquely from the main staff, drawing up its spade in its own plane, or nearly so. To the upper end of the sliding staff a handle, F, is secured. This handle is, preferably, turned toward the staff A, which is provided with a finger-catch, $h$, adapted to be operated by a finger of the hand which grasps the handle F. The handle of the main staff is indicated at G.

In operating this implement, the main staff A is held in the left hand, while the right hand grasps the handle F of the sliding staff, with the back of the hand upward. The staff B is then raised, with its spade, and the spade of the main staff is inserted in the ground at one side of the plant, the foot, if necessary, being placed on the lower guide D or other ledge. With the right hand the sliding spade is now pushed downward until, entering the ground on the opposite side of the plant, it meets the spade of the main staff, when the plant with its soil will be inclosed in the V-shaped receptacle formed by the spades, and may be removed out of the ground and carried to any place whither it is desired to transplant it, the forefinger of the right hand holding the jaws closed by seizing the catch $h$ of the main staff. In order to introduce the plant into its new bed, the blades, closed, as above described, are pushed with both hands, and, if necessary, the foot, into the ground. Then, the left hand holding the main staff down, the sliding staff is raised with the right, drawing its blade out of the ground neatly, without disturbing the soil. Then the other spade is withdrawn from the ground and the plant is left in its new bed, neatly fitted with its own earth around its root.

Sometimes several V-shaped troughs may be nailed between the same head-pieces, forming a series of receptacles in one frame, capable of holding quite a number of plants.

In pulling out surplus plants, the stalks or roots are caught between the beveled lower edges of the spades, when brought together, and thus drawn out of the ground.

I am aware that parallel alternating staffs with curved blades at their lower ends, as shown in patent dated May 17, 1870, No. 103,082, are not new, and therefore I do not claim such invention, broadly; but

What I claim as new, and desire to secure by Letters Patent, is—

The main staff A, having the inclined guide-irons D D, and the spade C, having a quadrangular back, b, and a triangular side, c, in combination with the sliding staff B, having perforated slide-irons E, and a corresponding spade, C, substantially as shown and described.

In testimony that I claim the above I have hereunto subscribed my name in the presence of two witnesses.

NORMAN McLEOD.

Witnesses:
　WILLIAM A. McLEOD,
　JOHN J. LOWE.